United States Patent [19] [11] 4,337,729
Peppler et al. [45] Jul. 6, 1982

[54] TRAVELING HOPPER FEED DELIVERY SYSTEM

[75] Inventors: William Peppler; Mark Skinner, both of Decatur, Ala.

[73] Assignee: Chore-Time Equipment, Inc., Milford, Ind.

[21] Appl. No.: 149,337

[22] Filed: May 13, 1980

[51] Int. Cl.³ .......................................... A01K 39/012
[52] U.S. Cl. ................................................ 119/52 B
[58] Field of Search ................... 119/52 B, 52 AF, 18

[56] References Cited

U.S. PATENT DOCUMENTS

| | | | |
|---|---|---|---|
| 2,786,448 | 3/1957 | McMaster | 119/52 B |
| 3,158,137 | 11/1964 | Summerour | 119/22 |
| 3,273,539 | 9/1966 | Cooper | 119/52 B |
| 4,019,461 | 4/1977 | Keen et al. | 119/18 |
| 4,195,594 | 4/1980 | Siciliano et al. | 119/52 B |

FOREIGN PATENT DOCUMENTS

720664  11/1965  Canada .............................. 119/52 B

Primary Examiner—Hugh R. Chamblee
Attorney, Agent, or Firm—Trexler, Bushnell & Wolters, Ltd.

[57] ABSTRACT

A traveling hopper feed delivery system is disclosed. The system includes hoppers which carry loads of feed past elongated feed-receiving troughs. These troughs are located adjacent poultry-retaining cages. Auger distributor conveyors carried by the hoppers draw the feed from each hopper bottom and urge it toward each feed trough. Delivery tubes depend from the auger conveyors for directing limited amounts of feed from the conveyors to each trough. Return means return undelivered feed from the distributor conveyors back to the respective hoppers. Sensors disposed to extend into the troughs sense the amount of feed already present in the troughs, and adjust butterfly valves (located between the feed delivery tubes and the auger conveyors) in response to the sensed height of feed present in the troughs before additional feed is delivered.

43 Claims, 9 Drawing Figures

TRAVELING HOPPER FEED DELIVERY SYSTEM

BACKGROUND OF THE INVENTION

This invention relates generally to feeding systems for poultry and the like, and more particularly concerns a traveling hopper feeding system which will efficiently deliver a uniform mix of feed to a great number of poultry cages many times a day.

In modern poultry operations, relatively sophisticated equipment permits large flocks of poultry to be maintained at high levels of performance with relatively small amounts of hand labor or husbandman attention. For example, the production of high quality eggs by a layer flock can be maximized by the use of highly specialized poultry care equipment, and by feeding the layer hens on a diet which is carefully controlled as to the amount and nature of feed provided. Large numbers of hens can be cared for and their egg production maximized if they are caged, and if careful control is exercised over the amounts and the nature of the feed mixture delivered to these caged hens.

It is the general object of the present invention to provide a poultry feeding system for use with caged poultry which will deliver an accurately metered amount of feed to a feed receptacle or trough associated with each cage, and which will do so quickly and efficiently.

It is another object of the invention to provide a poultry feeding system which will deliver feed so that a given amount of feed is presented at each cage after feed delivery is complete, regardless of how much feed has previously been taken from the receptacle associated with the cage.

A related object is to provide a feed delivery system which delivers accurately and precisely measured amounts of feed to each poultry-containing cage.

Yet another object is to provide a feeding system which will minimize if not entirely eliminate the possibility that the feed mix being delivered might separate into constituent parts while it is being handled by the feed system.

Still another object is to provide such a feeding system which minimizes the amount of electrical or other energy required to properly operate the system.

A further object is to provide such a system which is reliable and rugged in design and operation, and which minimizes the time, effort and money to be spent on maintenance and repair.

Other objects and advantages of the invention will become apparent upon reading the following detailed description and upon reference to the drawings. Throughout the drawings, like reference numerals refer to like parts.

DETAILED DESCRIPTION

While the invention will be described in connection with a preferred embodiment, it will be understood that it is not intended to limit the invention to this embodiment. On the contrary, it is intended to cover all alternatives, modifications and equivalents as may be included within the spirit and scope of the invention as defined by the appended claims.

THE SYSTEM IN GENERAL

Figure 1:
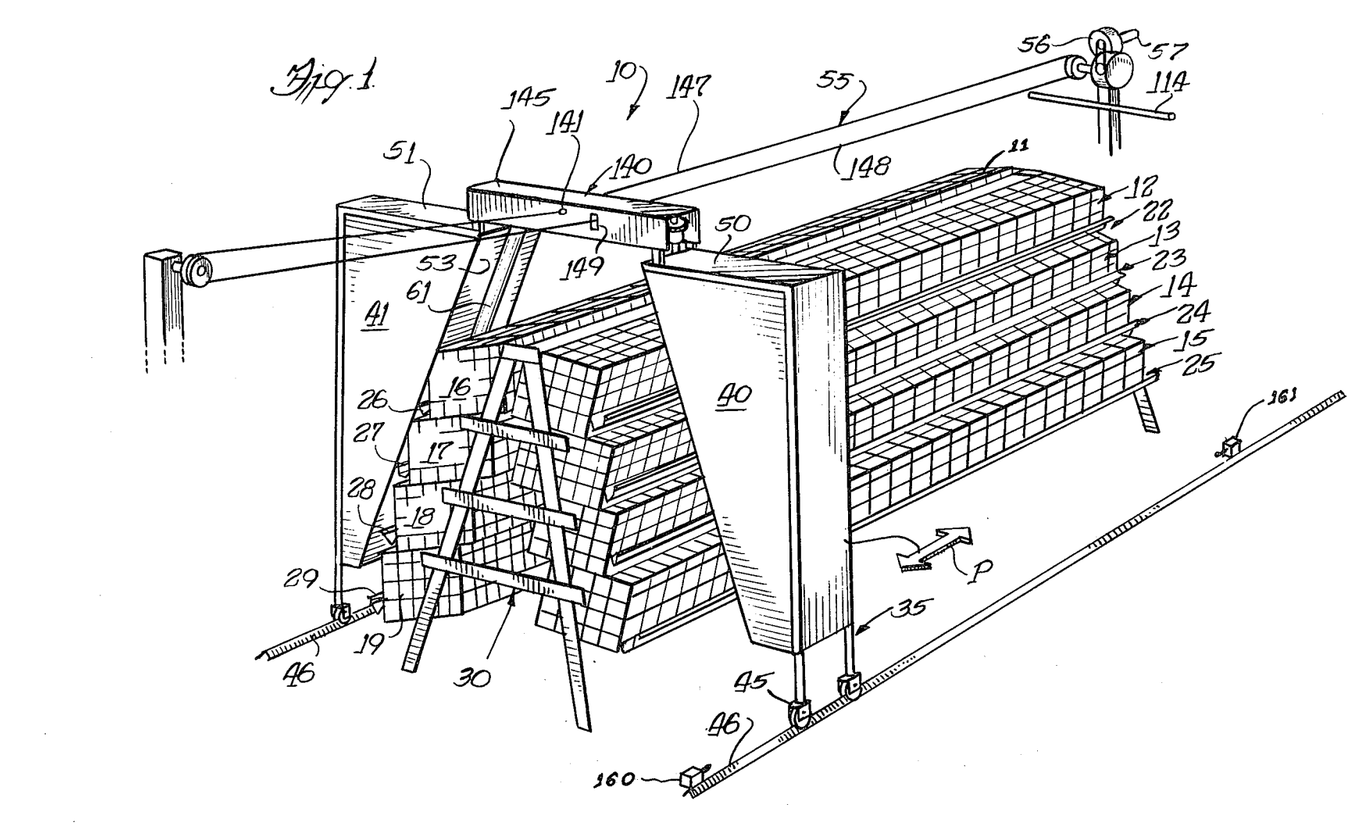
FIG. 1 is a perspective view showing an embodiment of the invention in its general aspect.
Figure 2:
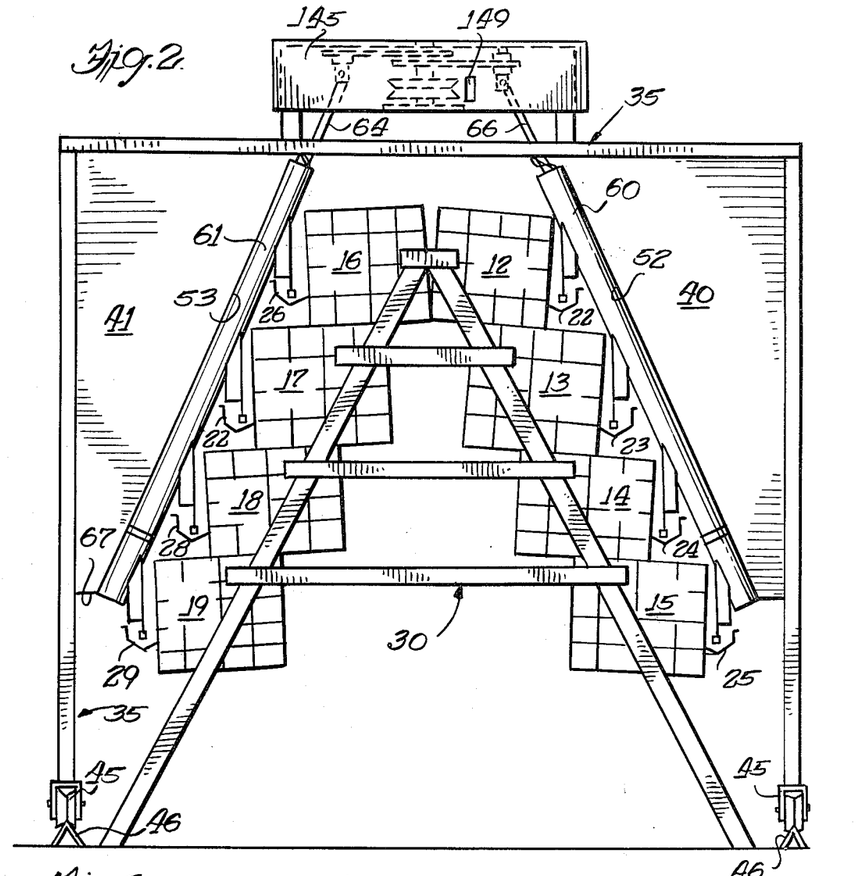
FIG. 2 is an end elevational view of the system shown in FIG. 1.

The general appearance of the novel poultry feeding system 10 is shown in FIGS. 1 and 2. Poultry cages 11 are arrayed in rows 12–19 inclusive. Associated with each row 12–19 is a feed receptacle; here this receptacle takes the form of an unobstructed elongated trough 22–29 extending along the lower front of each corresponding cage row 12–19. The cages (and, indirectly, the troughs) are mounted upon suitable support structure, which here takes the form of an A-frame 30. One form of this cage structure is claimed and disclosed in U.S. Pat. No. 4,060,055.

Mounted for reciprocal or reversible movement over and past this array of cages is a movable frame 35, which here supports two hoppers 40 and 41. Each hopper 40 and 41 is adapted to contain a relatively large amount of feed. The support structure 35 is provided with wheels 45 which engage rails 46 so that the frame 35, the movably supported hoppers 40 and 41, and other apparatus described below can be easily moved past and over the cages 12–19 and the associated troughs or receptacles 22–29. This hopper motion is caused by a cable system 55 which is powered by an electric motor 56. In order that this motion can occur at prescheduled times, a timer 57 can be associated with the motor 56.

THE HOPPERS

Figure 5:
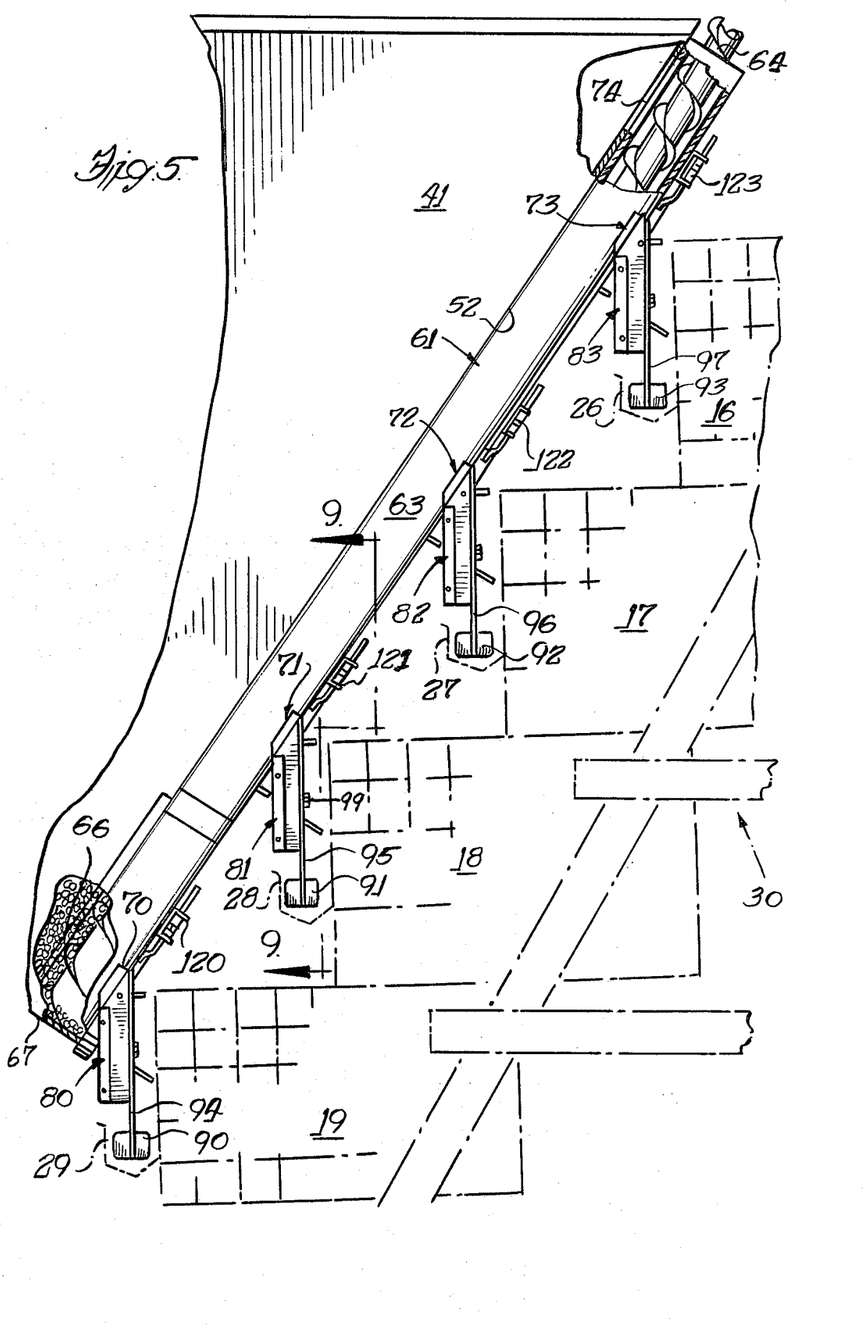
FIG. 5 is a fragmentary end elevational view, partially broken away, showing portions of the hopper, the distributor conveyor, and the feed delivery mechanism located at the side of the system.

As explained above, the hoppers 40 and 41 are reciprocably carried on each side of the cages 12–19 and troughs 22–29, and are generally triangular in shape, as best seen in FIGS. 1, 2 and 5. Each hopper is sized to carry a relatively large amount of feed. For example, each hopper can carry enough feed to supply the associated troughs or receptacles 22–25 and 26–29 with, say, a day's feed. Each hopper 40 and 41 is provided with a top cover 50 and 51, respectively, to exclude dirt or other corruption. These hoppers 40 and 41 can be filled manually, or by the automatic operation of a header conveyor operating, if desired, on a timed cycle, in known manner.

It is a feature of the invention that maximum bin volume is attained with minimum bin outer dimension, and that the bins are located closely adjacent the associated troughs or receptacles 22-29. To this end, each bin is partially defined by a diagonally oriented wall 52 and 53, extending upwardly from the bin bottom point.

THE DISTRIBUTOR CONVEYORS

In accordance with the invention, feed is delivered to each trough or receptacle 22-29 as the bins or hoppers 40 and 41 are moved along the path P adjacent and over the cages and troughs or receptacles. To this end, distributor conveyors 60 and 61 are mounted on the inclined hopper walls 52 and 55 and over the receptacles or troughs 22-29. As shown particularly in FIG. 5, the distributor conveyor 61 includes a tube or housing 63 which carries inside it a screw or auger member 64. This conveyor 61 receives feed from the hopper 41 at a feed access point 66 located at or immediately adjacent the bottom 67 (see FIG. 2) of the hopper 41. In the illustrated embodiment, this feed access point 66 is inexpensively provided by simply forming a hole at the bottom of the diagonal hopper wall 52. By locating this hole 66 at the hopper bottom 67, that feed which has been in the hopper longest finds its way to the distributor conveyor. It will be understood that the construction and operation of the conveyor 60 is identical to that described for the conveyor 61, and includes an auger flight member 65.

When the auger member 64 is rotated (by means described below) the feed is drawn upwardly along the conveyor 61, and is routed to flow past feed delivery points 70, 71, 72 and 73 defined in and on the conveyor tube 63. At each feed delivery point 70-73, some of the feed flow is diverted or dispensed to the underlying troughs or receptacles 26-29 inclusive.

To insure positive feed delivery, and to encourage delivery of a properly uniform mix of feed to and through each of the delivery points 70-73, and thus to the underlying troughs 26-29, an excess of feed is drawn along the distributor conveyor 63 past each delivery point 70-73 as the hopper moves along its path of travel P. The undelivered or excess feed present at the last dispensing point 73 is then drawn further upward to a feed return point or aperture 74 formed in the diagonal hopper wall 52. Here, the excess feed is urged through the return aperture 74 and back into the interior of the hopper 41. In this way, feed mix separation is discouraged, and delivery of the proper amount of each constituent of the feed mix to each caged bird is promoted, in accordance with one aspect of the invention. Again, it will be understood from reference to FIG. 2 that the opposite conveyor 60 operates like the conveyor 61, and delivers feed to the underlying troughs or receptacles 22-25 in a manner similar to the operation of the conveyor 61 and its associated apparatus.

THE FEED DELIVERY TUBES

In accordance with another aspect of the invention, feed is delivered to the troughs or receptacles 22-29 so that a given amount of feed is presented at each cage after the hoppers 40 and 41 have passed that cage, regardless of how much feed has previously been consumed or taken from the receptacles by the cage residents. To this end, feed delivery tubes 80-83 are provided at each feed dispensing outlet 70-73, and a sensor and valve arrangement is associated with each tube and the underlying trough or receptacle.

To accomplish this feed sensing and corresponding feed flow adjustment, sensor paddles 90-93 inclusive are carried by arms 94-97 respectively so that the sensor paddles 90-93 are positioned generally within the corresponding troughs or feed receptacles 26-29. As illustrated particularly in FIGS. 6 and 9, these arms or rods 94-97 are pivotally mounted as by pivot pin mechanisms 99 carried upon a side of feed delivery tubes 80-83. As can be envisioned from FIG. 9, when a paddle, such as the illustrated paddle 91, encounters feed F in the underlying trough 28, the paddle and paddle arm 95 are rotated about the pivot 99. This action provides corresponding movement to a distal paddle arm end 100.

Figures 6, 9:
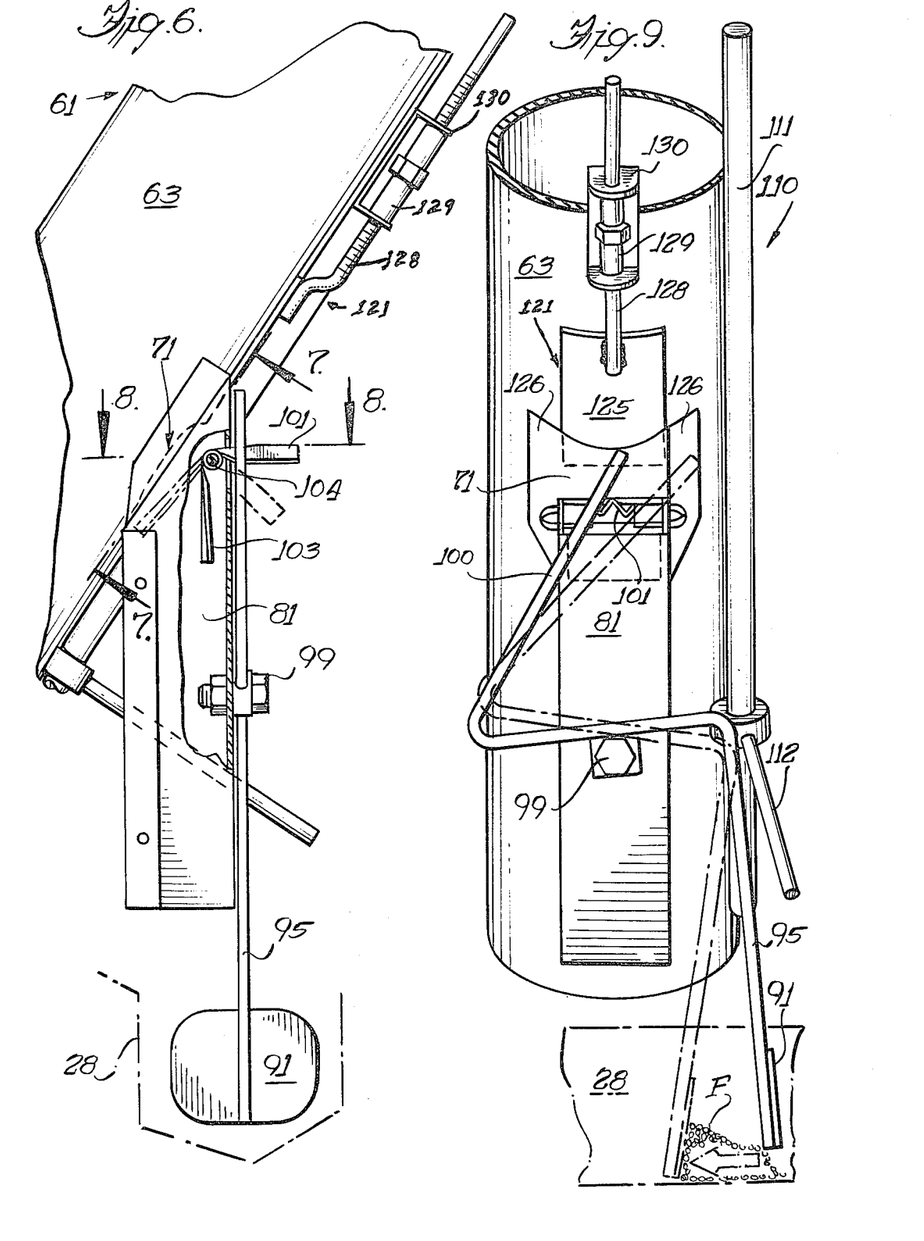
FIG. 6 is an enlarged fragmentary side elevational view, showing in yet further detail a portion of the feed conveyor and delivery mechanism.
FIG. 9 is a sectional and development view taken substantially in the plane of line 9—9 in FIG. 5 and showing in further detail much of the system shown in FIG. 6.

Now, the distal paddle arm end 100 engages a finger 101 affixed to a butterfly valve 103 mounted by a pivot 104 for motion toward and away from the adjacent feed delivery aperture 71. Thus, when an accumulation of feed F is encountered in the trough 28 by the sensor 91, feed flow through the corresponding aperture 71 and down the depending feed delivery tube 81 is restricted or, if required, halted entirely by closure of the butterfly valve 103 toward the feed delivery aperture 71.

In carrying out the invention, it may be desirable to halt all feed flow through the delivery apertures 70-73 when the hoppers 40, 41 are being returned from the far end of the cage rows to their original starting positions. To accomplish this, a butterfly valve closing and locking mechanism 110 is provided. Here, this locking mechanism 110 includes a pivot rod 111; extending from this rod 111 are a number of fingers 112. When the hoppers 40, 41 and associated mechanism reach the far end of travel, the appropriately mounted striker rod 114 (FIG. 1) engages an extension of the pivot rod 111 and rotates the rod 111 to a locking position. This rotational motion forces the fingers 112 into engagement with the paddle arms 95, and consequently closes the butterfly valves 103. In this way, the butterfly valves 103 are maintained in a closed position and no feed is delivered to the troughs 22-29 as the hoppers 40, 41 are returned to their original locations. When the hoppers reach their original locations, these lock rods 111 can be re-rotated, either manually or automatically as by another striker rod, into position to permit free opening and independent action of the butterfly valves 103 once again.

Figure 7:
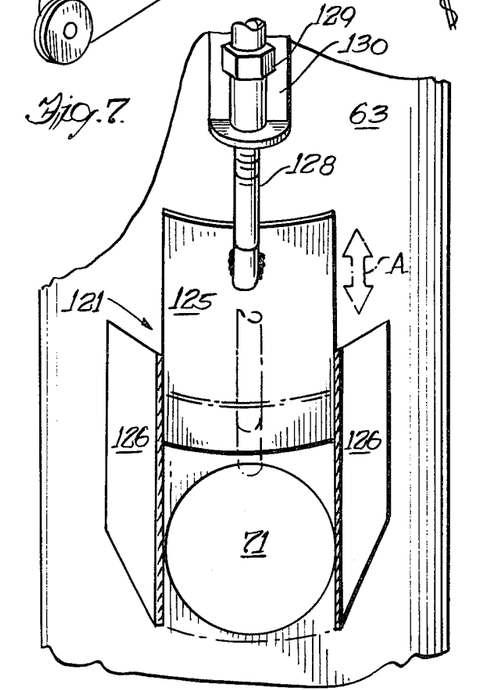
FIG. 7 is a development view taken substantially in the plane of line 7—7 in FIG. 6 and showing in section and in further detail a portion of the feed delivery system.
Figure 8:
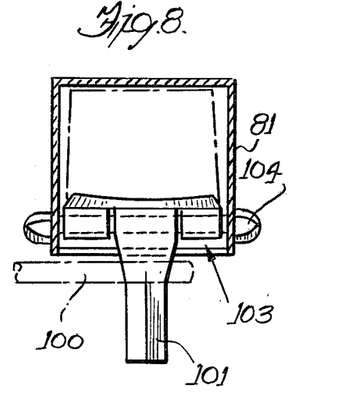
FIG. 8 is a development and sectional view taken substantially in the plane of line 8—8 in FIG. 6 and showing in still further detail a portion of the feed delivery system.

It is a feature of the invention that the maximum rate or amount of feed flow through the apertures 70-73 can be adjusted. To this end, slide mechanisms 120-123 are associated with each feed delivery aperture 70-73. A typical feed aperture adjustment mechanism 121 (illustrated in FIGS. 6, 7 and 9), include a slide plate 125 carried in small ways 126 for movement over the associated aperture hole 171. The ways 126 can be economically formed so as to be part of the associated feed delivery tube 81. Secured to this slide 125 is a threaded adjustment rod or screw 128 which engages an adjustment nut 129 carried upon a mount 130 fixed, as by welding, to a conveyor tube 63. As indicated by the arrow A in FIG. 7, this slide can be moved over the feed dispensing aperture 71 to a greater or lesser degree, thereby adjusting the effective size of that aperture 71 and, consequently, the maximum amount of feed which can be delivered over any given time through the aperture 71 to the associated and depending delivery tube 81.

SYSTEM DRIVE MECHANISM

It is a feature of the invention that the hoppers 40, 41 and the associated mechanisms can be moved or driven in their intended manner by but a single source of motive power, thereby reducing the amount of power required to operate this system. As explained above, a single electric motor 56, operated by a timer 57, pulls an endless cable 55. To achieve an appropriate rate of hopper travel, a speed reducing mechanism 135 can be interposed between the motor 56 and a cable drive pulley 136. An idler pulley 137 is located at the opposite end of the cable runs and hopper travel path. Here, the ends 140, 141 of this cable 55 are attached to a header mechanism portion 145 of the frame 135. In this way, a cable pulling action can be applied to the header 145 and frame 35 for moving the system in either direction as indicated by the arrow P in FIG. 1.

Figure 3:
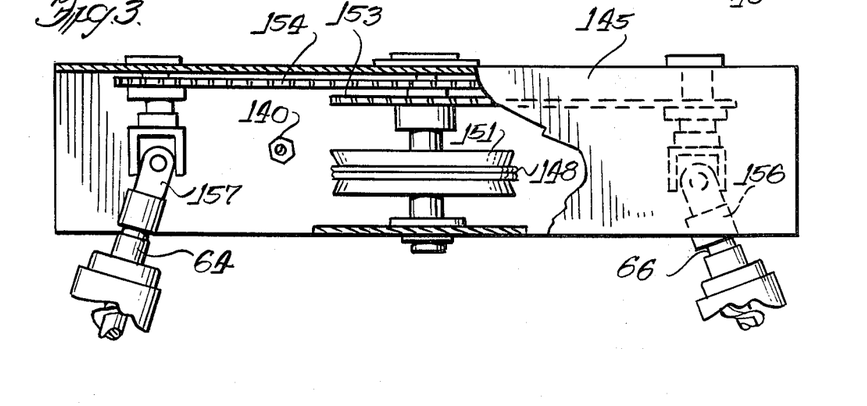
FIG. 3 is a fragmentary elevational view, partially broken away, showing portions of the hopper drive mechanism located at the top of the apparatus.
Figure 4:
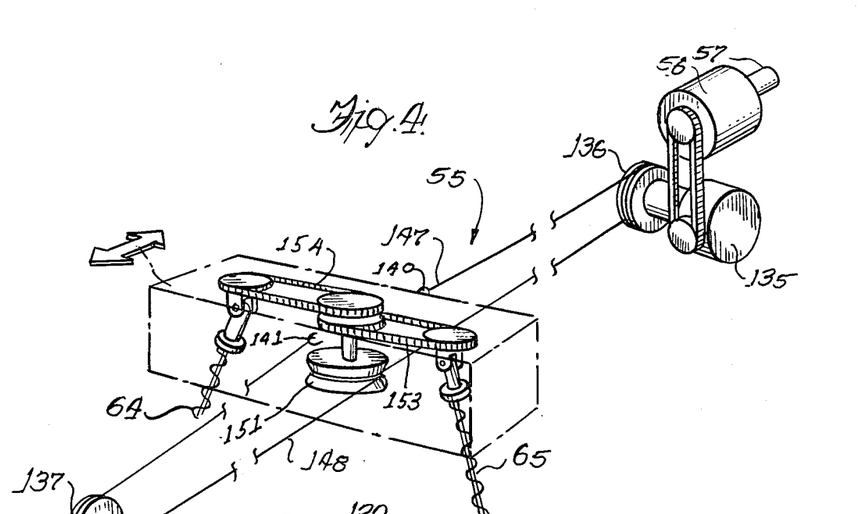
FIG. 4 is a perspective view showing, in somewhat schematic form, additional portions of the hopper drive mechanism.

These ends 140 and 141 can be considered interruptions in a first cable run 147. The opposite cable run 148 enters this header mechanism 145 through an appropriate aperture 149, and leaves the other side of the header mechanism 145 through a similar aperture (not shown). As shown particularly in FIG. 3, this second cable run 148 is wound around a drum or drive sheave 151 so that, as the frame 35 and hoppers 40, 41 are moved in one direction by the first cable run 147, the opposite cable run 148 rapidly turns a drive sheave 151 journalled inside the header 145. This rotating drive sheave 151 turns the augers 64, 65 through intermediate drive mechanisms such as chain and sprocket drive devices 153 and 154. Universal joints 156, 157 can be included if necessary to alter slightly the axis of rotational motion so as to accommodate the diagonal disposition of the auger conveyor flight members 64, 65.

OPERATION

In operation, then, bulk amounts of feed are delivered to the tops 50, 51 of the hoppers 40, 41 by manual or known mechanical means. At preselected intervals the timer 57 energizes the drive motor 56, and the frame 35 and hoppers 40, 41 are pulled past the troughs 22–29. Simultaneously, the distributor conveyors 60, 61 are operated to present feed to the delivery tubes 80–83 and others). The sensor paddles (90–93 and others) operate the butterfly valves (103 and others) to adjust the feed flow down the delivery tubes to the troughs or receptacles so as to provide a uniform level of feed at each spot in the troughs or receptacles after the hoppers have passed those spots. When the hoppers 40, 41 reach the end of their travel, the hopper motion can be halted by appropriate limit switches 160, 161 connected to the motor 56 in known manner, or by the timer 57. The hoppers 40, 41 are then returned to the starting positions illustrated in FIG. 1 for refilling if necessary, and for subsequent receptacle-refilling journeys.

The invention is claimed as follows:

1. A feeding system for delivering feed to feed receptacles associated with rows of animal confinement cages, the system comprising, in combination, a mobile frame, hopper means mounted on the frame for carrying a load of feed past the feed receptacles, distributor conveyor means defined by a conveyor wall and carried by the hopper means for drawing feed from the hopper and for urging it toward each feed receptacle, the conveyor wall defining a feed drop-out aperture, drive means carried by the mobile frame for operating the distributor conveyor means, the drive means including cable means having one cable run drivingly connected to the mobile frame for pulling the frame and hopper means along the feed receptacles and an opposite cable run, the drive means further including a drive sheave drivingly connected to the distributor conveyor means and having the second cable run trained about the drive sheave so as to operate the distributor conveyor means whenever the feed hopper is moved, the system further including delivery means for delivering limited amounts of feed from the distributor conveyor means wall aperture to each feed receptacle, sensor-operated valve adjustment means located at the conveyor wall aperture for adjusting the flow of feed from the distributor conveyor means to the feed receptacles, and return means for returning undelivered feed from the distributor conveyor means back to the hopper means.

2. A feeding system according to claim 1 wherein said hopper means is partly defined by at least one hopper wall extending upwardly over the receptacles, said wall carrying said distributor conveyor.

3. A feeding system according to claim 2 wherein said hopper means defines a feed access point aperture in said hopper wall for permitting feed flow from said hopper means to said distributor conveyor means.

4. A feeding system according to claim 3 wherein said hopper is further defined by a bottom, and wherein said feed access point is located substantially at the hopper bottom.

5. A feeding system according to claim 2 wherein said return means includes an aperture defined in said outwardly extending hopper wall.

6. A feeding system according to claim 5 wherein said hopper is further defined by a top, and wherein said aperture is located adjacent the hopper top.

7. A feeding system according to claim 2 wherein said upwardly extending hopper wall is diagonally disposed.

8. A feeding system according to claim 1 including a plurality of said hopper means.

9. A feeding system according to claim 1 including wheel means journalled at the bottom of said frame means for movably supporting said system for its motion.

10. A feeding system according to claim 1 further said system including a plurality of said hopper means supported by the frame means for motion past the feed receptacles.

11. A feeding system according to claim 1 wherein said mobile frame includes a frame head portion mounted above said hopper means and the cages, said one cable run being attached to the frame head.

12. A feeding system according to claim 1 wherein said delivery means includes a butterfly valve means associated with said distributor conveyor means for adjusting the flow of feed from the conveyor means to each feed receptacle.

13. A system according to claim 12 and further comprising sensor means including a probe extending into the feed receptacles and connected to said butterfly valve means for operating the butterfly valve means in response to the sensed height of feed present in the feed receptacles before additional feed is delivered to the feed receptacles.

14. A feeding system according to claim 1 including preliminary adjustment means associated with said distributor means and said delivery means for adjusting the maximum rate of feed flow through the delivery means to the feed receptacles.

15. A feeding system according to claim 1 including closure lock means for halting feed flow to and through said delivery means regardless of the presence or absence of feed in the feed receptacles.

16. Apparatus according to claim 15 including automatic closure lock operating means located at a given point along the path of hopper movement for operating the closure lock means at the end of a given route of hopper travel.

17. A feeding system for delivering feed to feed receptacles associated with rows of animal confinement cages, the system comprising the combination of a plurality of hoppers for carrying feed and adapted for movement along and past the receptacles, a mobile support frame for carrying the hoppers, each hopper defining a feed access point, a distributor conveyor means extending from each hopper feed access point over the receptacles and having a conveyor wall defining at least one feed delivery point aperture at which a flow of feed can be diverted to the feed receptacles, distributor conveyor drive means carried by the support frame for operating the distributor conveyor means and sensor-operated adjustment means including valve means at each feed delivery point aperture for adjusting the feed flow from the distributor conveyor means to the feed receptacle in response to the sensed amount of feed already present in the receptacle.

18. A feeding system according to claim 17 wherein at least one said hopper is partly defined by at least one wall extending upwardly over the feed receptacles and carrying the distributor conveyor.

19. A feeding system according to claim 18 wherein said hopper is further partially defined by a hopper bottom, and wherein said feed access point is located substantially at the hopper bottom.

20. A feeding system according to claim 19 wherein said hopper feed access point includes an aperture defined in said upwardly extending hopper wall.

21. A feeding system according to claim 18 including return means for returning undiverted feed from said distributor conveyor means back to said hopper.

22. A feeding system in accordance with claim 21 wherein said return means includes an aperture defined in said upwardly extending hopper wall.

23. A feeding system according to claim 17 wherein said conveyor drive means includes cable means extending in the general direction of the feed receptacles and having one cable run drivingly associated with the hopper for pulling the hopper along the feed receptacles.

24. A feeding system according to claim 23 wherein said conveyor drive means further includes a drive sheave drivingly connected to the distributor conveyor means, and an opposite cable run being trained about the drive sheave for operating the distributor conveyor means.

25. A feeding system according to claims 1 or 17 wherein said valve comprises a butterfly valve adapted to open from and close toward the conveyor delivery point aperture to correspondingly increase and decrease the flow of feed from the distributor conveyor through the delivery point.

26. A feeding system according to claims 1 or 17 wherein said sensor-operated adjustment means includes a probe extending into the feed receptacle and connected to the valve means for operating the valve means in response to the height of feed present at the feed receptacle before additional feed is delivered thereto.

27. A feeding system according to claim 17 wherein said distributor conveyor includes a conveyor wall, and wherein said feed delivery point includes an aperture defined in said conveyor wall, the system further including preliminary adjustment means for adjusting the maximum effective size of the conveyor delivery point aperture regardless of the operation of said sensor-operated adjustment means.

28. A feeding system according to claims 1 or 17 further including closure lock means for closing the feed delivery point and inhibiting all flow of feed therethrough regardless of the presence or absence of feed in the feed receptacle.

29. A feeding system according to claim 28 further including automatic closure lock opeating means located at a given point along the path of hopper movement for operating the closure lock means at the end of a given hopper travel.

30. A feeding system for delivering feed to feed troughs associated with rows of animal confinement cages, the cages and troughs being arrayed in pyramidal, stepped-back, A-shaped array, the system comprising the combination of a mobile frame, cable means extending along the cages and having at least one cable run connected to the mobile frame for pulling the mobile frame along and past the troughs, a plurality of hoppers carried by the mobile frame, hoppers mounted on the frame for carrying feed for movement along the troughs, at least one hopper being disposed on each steppedback side of the A-shaped cage array, each hopper being partly defined by a hopper bottom, distributor conveyor means having a conveyor wall extending from a hopper feed access point substantially at the hopper bottom in an upward direction over the troughs to a return point for returning feed to the hopper and defining at least one feed delivery point aperture, sensor-operated adjustment means including valve means located at the delivery point aperture for adjusting the flow of feed from the distributor conveyor means to a trough, distributor conveyor drive means carried by the frame for operating the distributor conveyor means a plurality of feed delivery outlets being defined on and in the distributor conveyor, and a delivery tube extending from each delivery point down into an associated trough.

31. A feeding system according to claim 30 wherein each said hopper is partly defined by at least one wall extending diagonally upwardly over a plurality of the feed troughs and carrying the distributor conveyor.

32. A feeding system according to claim 31 wherein said access point is an aperture defined in said hopper.

33. A feeding system according to claim 32 wherein each said hopper includes a hopper bottom, and wherein a said hopper feed access point aperture is located substantially at each hopper bottom.

34. A feeding system according to claim 31 wherein said return point includes an aperture defined in said upwardly extending hopper wall.

35. A feeding system according to claim 34 wherein each said hopper includes a hopper top, and a said feed return aperture is located adjacent that hopper top.

36. A feeding system according to claim 30 including cable means extending over the cage array, and having one cable run drivingly associated with said hoppers for pulling said hoppers along the cage and troughs.

37. A feeding system according to claim 36 wherein said distributor conveyor drive means includes a drive sheave drivingly connected to the distributor conveyor means, and an opposite cable run being trained about the drive sheave for operating the distributor conveyor when the feed hopper is moved.

38. A feeding system according to claim 30 wherein said mobile frame further comprises a frame head member mounted above the hoppers and cages, said cable means being attached to the frame head.

39. A feeding system according to claim 38 wherein said distributor conveyor drive means further includes a drive sheave drivingly connected to the distributor conveyor means, a second cable run engaging the drive sheave for operating the distributor conveyor means when the feed hoppers are moved.

40. A feeding system according to claim 30 further comprising preliminary adjustment means for adjusting the effective size of the feed delivery outlets so as to adjust the maximum amount of feed which can be delivered through each said outlet.

41. A feeding system for delivering feed to feed troughs associated with rows of animal confinement cages, the cages and troughs being arrayed in a vertically extending array, the system comprising the combination of a mobile frame, a plurality of hoppers mounted on the mobile frame for carrying feed and adapted for movement along a side of the troughs, each hopper being partly defined by a hopper bottom below the troughs, distributor conveyor means extending from a hopper feed access point substantially at the hopper bottom in an upward direction over the troughs, at least one feed delivery outlet being defined on and in the distributor conveyor above at least one trough for delivering feed from the conveyor to that trough, sensor-operated valve means at the feed delivery point for adjusting the flow of feed from the conveyor to the trough, feed return means for returning undistributed feed from the distributor conveyor means back to the hoppers, cable means extending over the cage array, and having one cable run at least indirectly affixed to said hoppers for pulling said hoppers along the cages and troughs, the system including a drive sheave drivingly connected to the distributor conveyor means, and another cable run being trained about the drive sheave for operating the distributor conveyor when the feed hopper is moved.

42. A feeding system according to claim 41 including intermediate drive means for transferring driving motion from the drive sheave to the distributor conveyor means.

43. A feeding system for delivering feed to feed troughs associated with rows of animal confinement cages, the cages and troughs being arrayed in a vertical, opposed order, the system comprising the combination of a pair of hoppers for carrying feed and adapted for movement along the troughs, each hopper being partly defined by a hopper bottom, distributor conveyor means extending from each hopper feed access point substantially at the hopper bottom in an upward direction over the troughs, at least one feed delivery outlet being defined on and in the distributor conveyor, above at least one trough for delivering feed from the conveyor to that trough, sensor-operated valve means at the feed delivery outlet for adjusting the flow of feed from the distributor conveyor to the trough, a movable frame for supporting the hoppers, cable means having a cable run attached to the frame and hoppers, and another cable run drivingly connected to the distributor conveyor means for operating the conveyor means when the frame and hopper are moved.

* * * * *

UNITED STATES PATENT AND TRADEMARK OFFICE
CERTIFICATE OF CORRECTION

PATENT NO. : 4,337,729
DATED : July 6, 1982
INVENTOR(S) : WILLIAM PEPPLER & MARK SKINNER It is certified that error appears in the above-identified patent and that said Letters Patent are hereby corrected as shown below:

Column 6, Lines 30-31, change "in said outwardly extending" to --in said upwardly extending--.

Signed and Sealed this

Seventh Day of September 1982

[SEAL]

Attest:

GERALD J. MOSSINGHOFF

Attesting Officer

Commissioner of Patents and Trademarks